No. 17,443.  J. R. MAXWELL.  FLUID METER.  PATENTED JUNE 2, 1857.

UNITED STATES PATENT OFFICE.

JAMES R. MAXWELL, OF CINCINNATI, OHIO.

IMPROVED FLUID-METER.

Specification forming part of Letters Patent No. 17,443, dated June 2, 1857.

*To all whom it may concern:*

Be it known that I, JAMES R. MAXWELL, of the city of Cincinnati, county of Hamilton, and State of Ohio, have invented a new and useful Improvement in Water-Meters; and I do hereby declare that the following is a full and exact description thereof, reference being had to the accompanying drawings, and to the letters and figures of reference marked thereon and made to form part of this specification.

Similar letters and figures refer to like parts of the improvement.

The nature of the improvement consists in the manner I employ of combining and arranging the parts of the meter together, which prevents the settling of dirt in the apparatus often contained in the water and causes the meter to work with ease and certainty.

To enable others skilled in the art to make and use my improvement, I will proceed to describe its construction and operation by referring direct to the accompanying drawings, in which—

Figure 2:
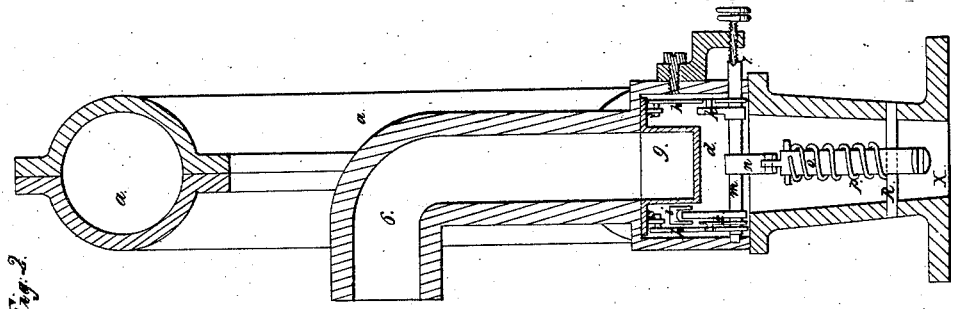
Figure 1:
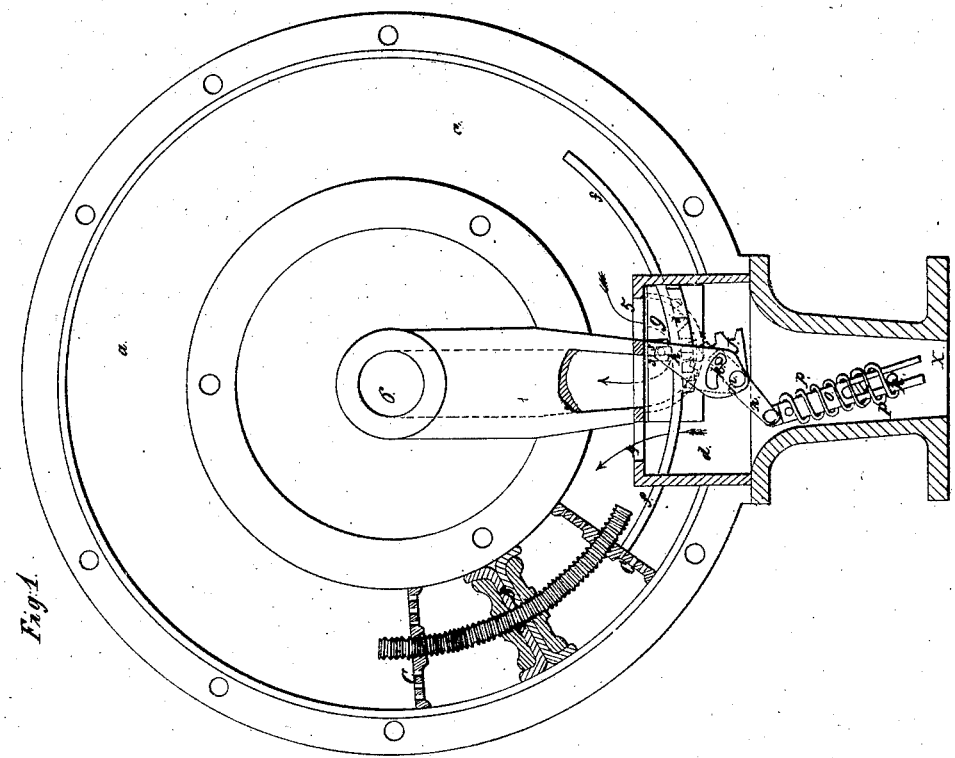

Figure 1 represents a vertical sectional elevation of the improvement, and Fig. 2 represents a transverse sectional elevation of the improvement through the valve for admitting and discharging water from the meter.

The meter in body consists of a cylindrical circular chamber or cylinder, furnished with a piston that receives a reciprocating motion, which piston alternately actuates a valve that admits and discharges a given quantity of water from the meter.

$a\ a$ is what I denominate the "cylinder" of the meter, formed by properly boring and fitting the pieces of metal together and holding them with bolts.

B represents the piston, furnished with guard-plates $c\ c$ at its ends to prevent friction by properly guiding the piston B around the bore.

$d$ is a valve-chest, $g$ the valve, and $f\ f$ a slide-rod furnished with a ratchet $i$ for actuating the valve $g$ through the quadrant-pinion J, levers K K, spindle $m$, levers $h\ h$, pins 3 3, lever $n$, rod $o$, spring P P, and rod R in the pipes X.

The operation of the meter is as follows: X represents the inducting-pipe, and $b$ the discharge-pipe. 4 and 5 are receiving-openings from the valve-chest $d$ into the cylinder-chamber $a\ a$, and the valve $g$ in form is like an ordinary slide-valve of a steam-engine, and works exactly upon the same principle in receiving water into and discharging it out of the cylinder $a\ a$. The way the meter is represented now shows the valve $g$ as discharging the water from the meter through the opening 5, and the meter is being filled in its opposite side through the opening 4, as directed by the dart marked —. The water acts on the piston B and forces it around as the water is drawn out through the opening 5 in the valve-chest until it strikes the end of the valve-rod $f$, which acts upon the quadrant-pinion J, attached to the shaft $m$, until the rod $n$ and $o$ is brought just beyond a vertical position. Then the spring P around the rod $o$, by acting on the pin R, causes the lever and pin K to actuate the lever $h$, which is made to move the valve $g$ by acting on the pins 3, placed on each side of the valve, after which the piston B is forced again to the other side of the meter by the admission of water, and thus alternately forced from one to the other side to keep up the action of the meter for receiving, measuring, and discharging the water therefrom.

What I claim as my improvement, and desire to secure by Letters Patent, is—

The arrangement of the piston B, with the parts employed for moving the valve $g$, all arranged as represented, and for purposes mentioned in the foregoing specification.

JAMES R. MAXWELL.

Witnesses:
  M. BENSON,
  CHARLES H. FOX.